United States Patent
Chung et al.

(10) Patent No.: US 10,288,914 B2
(45) Date of Patent: May 14, 2019

(54) LIQUID CRYSTAL DISPLAY WITH SWITCHABLE VIEWING ANGLE AND METHOD OF VIEWING ANGLE CONTROL

(71) Applicant: Infovision Optoelectronics(Kunshan) Co., Ltd., Kunshan, Jiangsu Province (CN)

(72) Inventors: Te-Chen Chung, Kunshan (CN); Zifang Su, Kunshan (CN); Limei Jiang, Kunshan (CN)

(73) Assignee: INFOVISION OPTOELECTRONICS (KUNSHAN) CO., LTD., Kunshan, Jiangsu Province (CN)

( * ) Notice: Subject to any disclaimer, the term of this patent is extended or adjusted under 35 U.S.C. 154(b) by 31 days.

(21) Appl. No.: 15/208,592

(22) Filed: Jul. 12, 2016

(65) Prior Publication Data
US 2017/0184885 A1    Jun. 29, 2017

(30) Foreign Application Priority Data

Dec. 24, 2015  (CN) .......................... 2015 1 0989378

(51) Int. Cl.
G02F 1/13     (2006.01)
G02F 1/1333   (2006.01)
G02F 1/1343   (2006.01)

(52) U.S. Cl.
CPC ...... *G02F 1/1323* (2013.01); *G02F 1/133345* (2013.01); *G02F 1/134309* (2013.01); *G02F 1/134363* (2013.01); *G02F 2001/134381* (2013.01); *G02F 2201/121* (2013.01); *G02F 2201/122* (2013.01); *G02F 2201/123* (2013.01)

(58) Field of Classification Search
CPC .................................................... G02F 1/1323
See application file for complete search history.

(56) References Cited

U.S. PATENT DOCUMENTS

| | | | |
|---|---|---|---|
| 2007/0046881 A1 | 3/2007 | Takei | |
| 2009/0102990 A1* | 4/2009 | Walton | G02F 1/1323 349/15 |
| 2010/0128189 A1* | 5/2010 | Teranishi | G02F 1/1323 349/33 |
| 2011/0007233 A1* | 1/2011 | Matsui | G02F 1/1337 349/43 |
| 2013/0187177 A1* | 7/2013 | Nanai | H01L 27/3246 257/88 |
| 2014/0002761 A1 | 1/2014 | Heo et al. | |

(Continued)

FOREIGN PATENT DOCUMENTS

| | | |
|---|---|---|
| CN | 1645195 A | 7/2005 |
| CN | 104155808 A | 11/2014 |

(Continued)

*Primary Examiner* — Sang V Nguyen
(74) *Attorney, Agent, or Firm* — Cheng-Ju Chiang (57) ABSTRACT

An LCD with switchable viewing angle includes a first substrate, second substrate, and a liquid crystal layer. The first substrate is provided with a first electrode and a second electrode. In an embodiment, the first electrode is a pixel electrode, and the second electrode is a common electrode. The second substrate is provided with a third electrode. Liquid crystal molecules in the liquid crystal layer are positive liquid crystal molecules. When a first bias voltage is applied to the third electrode, the LCD is displayed with a wide viewing angle; and when a second bias voltage greater than the first bias voltage is applied to the third electrode, the LCD is displayed with a narrow viewing angle.

6 Claims, 12 Drawing Sheets

(56) References Cited

U.S. PATENT DOCUMENTS

| | | | | |
|---|---|---|---|---|
| 2014/0132906 A1* | 5/2014 | Yoshioka | ............ | G02F 1/134309 349/141 |
| 2014/0184965 A1* | 7/2014 | Xu | ................ | G02F 1/1323 349/33 |
| 2014/0191933 A1* | 7/2014 | Fan | ................ | G02F 1/133 345/89 |
| 2014/0198271 A1* | 7/2014 | Kizu | ................ | G02F 1/1337 349/15 |
| 2014/0240651 A1* | 8/2014 | Yoshioka | ............ | G02F 1/134363 349/141 |
| 2014/0332254 A1* | 11/2014 | Pellerite | ............ | G02F 1/13439 174/251 |
| 2015/0146125 A1* | 5/2015 | Kita | ................ | G02F 1/133707 349/43 |
| 2015/0153619 A1* | 6/2015 | Murata | ................ | G02F 1/1337 349/123 |
| 2015/0170600 A1* | 6/2015 | Jinda | ................ | G02F 1/134363 345/206 |
| 2016/0004135 A1* | 1/2016 | Nakao | ................ | G02F 1/13394 349/42 |
| 2016/0341987 A1* | 11/2016 | Chung | ................ | G02F 1/1323 |

FOREIGN PATENT DOCUMENTS

| | | |
|---|---|---|
| CN | 104865757 A | 8/2015 |
| CN | 105068337 A | 11/2015 |
| CN | 105223743 A | 1/2016 |
| CN | 105372883 A | 3/2016 |
| JP | H10-197888 A | 7/1998 |
| KR | 10-2010-0031963 A | 3/2010 |
| TW | 201329526 A1 | 7/2013 |

\* cited by examiner

LIQUID CRYSTAL DISPLAY WITH SWITCHABLE VIEWING ANGLE AND METHOD OF VIEWING ANGLE CONTROL

CROSS-REFERENCE TO RELATED APPLICATION

The present application is based on and claims priority of Chinese patent application No. 201510989378.3, filed on Dec. 24, 2015. The entire disclosure of the above-identified application is hereby incorporated by reference herein and made a part of this specification.

TECHNICAL FIELD

The present application relates to liquid crystal display technology, and more particularly to a liquid crystal display (LCD) with switchable viewing angle, and a method of controlling the viewing angle of an LCD.

BACKGROUND

Liquid crystal display (LCD) has many advantages, such as, light weight, energy saving, no radiation, and accordingly has gradually replaced traditional cathode ray tube (CRT) display. LCDs are widely used in high-definition digital televisions, desktop computers, personal digital assistants (PDA), notebook computers, mobile phones, digital cameras, and other electronic devices.

Wide viewing angle is the mainstream development of an LCD. Presently, portable electronic devices such as notebook computers, personal digital assistants, tablet PCs, mobile phones are adopted with wide viewing angle technology, so that users can see the display images on the LCD without distortion when viewed from different viewing angles. However, when using the portable electronic device in public places, the wide viewing angle design of conventional LCD cannot effectively protect the privacy of the user, and the images displayed on the LCD can be easily viewed by a bystander in a squint direction. Therefore, in addition to the needs for a wide viewing angle, LCDs capable of being adjusted to a narrow viewing angle are thus developed in order to protect modern people's needs of privacy in public places.

Currently, there are mainly two ways to switch between a wide viewing angle and a narrow viewing angle in an LCD. One way is to use a louver shielding film to cover the screen so as to reduce the angle of view in the need for protecting privacy. However, this way needs preparation of an additional louver covering film, causing great inconvenience to the user. One louver covering film can only achieve a fixed viewing angle. Once a louver covering film is attached to the screen, then the viewing angle of the screen is fixed and cannot change according to requirement of the user. The other way is to provide a dual light source backlight system in the LCD to adjust the angle of view. The dual light source backlight system consists of two layers of laminated light guide plates in combination with an anti-prism lens, the top light guide plate (LGP-T) combined with the anti-prism lens is used to change the direction of lights and restrict the lights in a relatively narrow range to obtain a narrow viewing angle in the LCD, while the bottom light guide plate (LGP-B) combined with the function of the anti-prism lens is used to obtain a wide viewing angle in the LCD. However, the dual light source backlight system will cause the thickness and the cost of the LCD to increase remarkably, which is not in line with the development trend of light weight, compactness and slimness of the LCD.

SUMMARY

The present application provides an LCD with switchable viewing angle. The LCD can be switched between a wide viewing angle and a narrow viewing angle when it is required, without the need to use a louver shielding film or to provide a dual light source backlight system in the LCD, and without increasing the thickness and the cost of the LCD.

In one aspect, an LCD with switchable viewing angle is provided. The LCD includes a first substrate, a second substrate, and a liquid crystal layer disposed between the first substrate and the second substrate. The first substrate is provided with a first electrode and a second electrode, wherein one of the first electrode and the second electrode is a pixel electrode, and the other one of the first electrode and the second electrode is a common electrode. The second substrate is provided with a third electrode. Liquid crystal molecules in the liquid crystal layer are positive liquid crystal molecules.

By applying different bias voltages to the third electrode, the viewing angle of the LCD is controlled. When a first bias voltage having a relatively small magnitude is applied to the third electrode, the liquid crystal molecules in the liquid crystal layer will almost remain their original state, almost no light leakage is resulted in the dark state as the LCD is viewed from a squint direction, such that the LCD can achieve a wide viewing angle. When a second bias voltage having a relatively large magnitude is applied to the third electrode, a vertical electric field along the vertical direction is generated between the substrates, the positive liquid crystal molecules will rotate in a plane orthogonal to the substrates to possess a relatively large tilt angle relative to the substrates, a light leakage is resulted in the dark state as the LCD is viewed from a squint direction, and the contrast between the bright state and the dark state of the LCD is decreased, such that the LCD can achieve a narrow viewing angle.

In another aspect, a method of controlling a viewing angle of the LCD is provided. The method includes the steps: when the LCD is required to display with a wide viewing angle, applying a first bias voltage to the third electrode; and when the LCD is required to display with a narrow viewing angle, applying a second bias voltage greater than the first bias voltage to the third electrode. In the embodiment, the first bias voltage is in the range of 0.1V to 0.5V, and the second bias voltage is in the range of 2V to 5V.

Therefore, the viewing angle of the LCD can be easily switched between a wide viewing angle and a narrow viewing angle by simply applying different bias voltages to the third electrode. It is not required to use a louver shielding film or to provide a dual light source backlight system in the LCD, thus without increasing the thickness and the cost of the LCD and having the advantages of easy operation and good flexibility.

Other novel features and advantages will become more apparent from the following detailed description when taken in conjunction with the accompanying drawings.

DETAILED DESCRIPTION OF PREFERRED EMBODIMENTS

Exemplary embodiments of the present application are described in detail with reference to the accompanying drawings, but the present application is not limited to the following embodiments.

Figure 1:
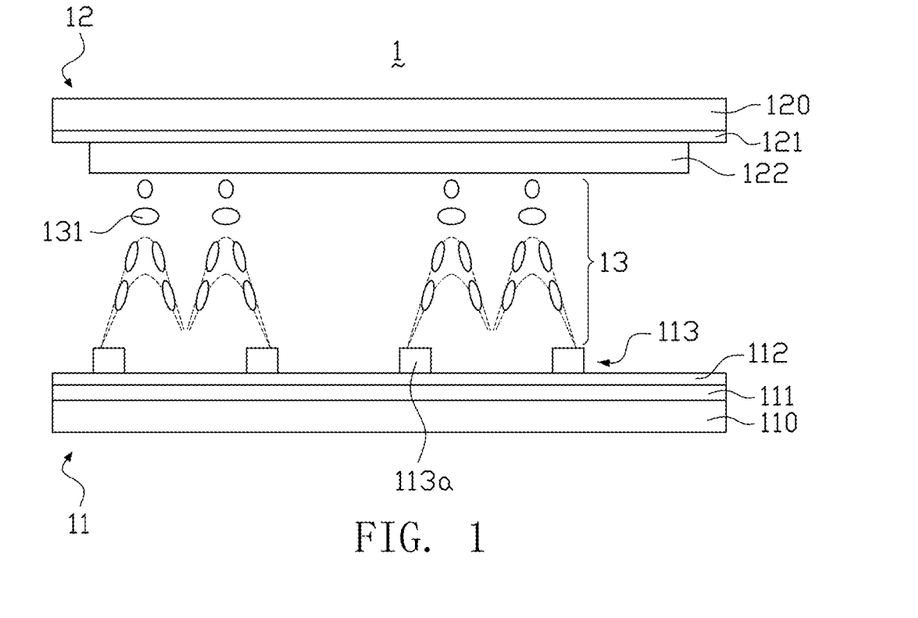
FIG. 1 is a schematic view showing an LCD displayed in a wide viewing angle according to an embodiment of the present application.
Figure 2:
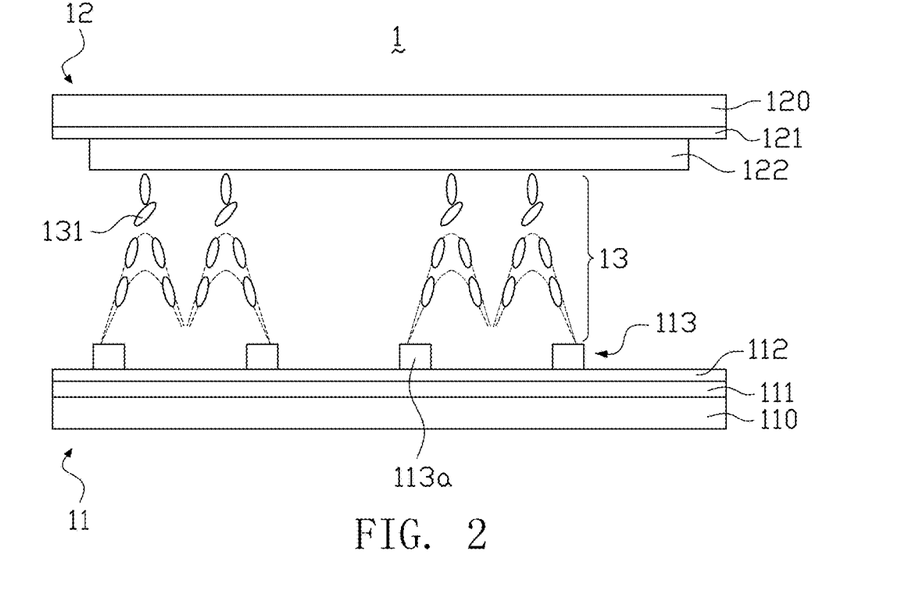
FIG. 2 is a schematic view showing the LCD of FIG. 1 displayed in a narrow viewing angle according to the embodiment of the present application.

FIG. 1 is a schematic view showing an LCD displayed in a wide viewing angle according to an embodiment of the present application. FIG. 2 is a schematic view showing the LCD of FIG. 1 displayed in a narrow viewing angle according to the embodiment of the present application. In order for clarity, in FIGS. 1-2, only a portion of the LCD is shown. Referring to FIGS. 1-2, the present application provides a liquid crystal display (LCD) 1 with switchable viewing angle. In the embodiment, the LCD 1 includes a first substrate 11, a second substrate 12 being disposed opposite to the first substrate 11, and a liquid crystal layer 13 being disposed and sealed between the first substrate 11 and the second substrate 12.

Generally, when a user views an LCD from different viewing angles, the brightness of image may reduce as the viewing angle increases. For traditional twisted nematic (TN) type LCD, common electrode and pixel electrode are separately formed on two different substrates, the liquid crystal molecules rotate in a plane orthogonal to the substrates. However, a viewing angle of TN type LCD is narrow as the orientations of liquid crystal molecules adjacent to the surfaces of the two substrates are orthogonal with each other. In order to realize wide viewing angle, both in-plane switch (IPS) type LCD employing a horizontal electric field and fringe field switching (FFS) type LCD employing a fringe electric field have been developed. For IPS type LCD or FFS type LCD, common electrode and pixel electrode are both formed on the same substrate (e.g., the TFT array substrate), the liquid crystal molecules rotate in a plane in parallel to the substrate to obtain improved viewing angle.

The LCD 1 is suitable for being applied in an FFS type LCD or an IPS type LCD in which the liquid crystal molecules rotate in a plane in parallel to the substrate when an electric field generated between the pixel electrode and the common electrode is provided for display. In the embodiment, the LCD 1 is shown as an FFS type LCD by an example.

Specifically, the first substrate 11 may be a thin film transistor (TFT) array substrate. The first substrate 11 may include a first transparent base 110, a first electrode 113, an insulating layer 112, a second electrode 111, a first alignment film (not shown), and a first polarizer (not shown). The first electrode 113, the insulating layer 112, the second electrode 111, the first alignment film and the first polarizer are formed on the first transparent base 110. The first polarizer is arranged on an outer surface of the first transparent base 110 far away from the liquid crystal layer 13. The first polarizer has a first light transmission axis. The first electrode 113, the insulating layer 112, the second electrode 111 and the first alignment film are arranged on an inner surface of the first transparent base 110 facing the liquid crystal layer 13. In the embodiment, the first electrode 113 and the second electrode 111 are insulated from each other by the insulating layer 112 disposed between the first electrode 113 and the second electrode 111. The first alignment film is located near the liquid crystal layer 13.

In the embodiment, the first electrode 113 is patterned to form a plurality of stripe-like electrodes 113a which are arranged in parallel to each other. The second electrode 111 wholly covers the first transparent base 110, that is, the second electrode 111 is a planar electrode without being patterned.

However, similar to the first electrode 113, the second electrode 111 may also be patterned to form a plurality of stripe-like electrodes which are arranged in parallel to each other, and the stripe-like electrodes of the second electrode 111 and the stripe-like electrodes 113a of the first electrode 113 may be alternately arranged with each other.

It should be noted that, when the LCD 1 is an IPS type LCD, the first electrode 113 and the second electrode 111 can be arranged on the same layer, and the insulating layer 112 can be omitted. In this case, each of the first electrode 113 and the second electrode 111 is patterned to form a plurality of stripe-like electrodes, and the stripe-like electrodes of the first electrode 113 and the stripe-like electrodes of the second electrode 111 are alternately arranged with each other.

The first electrode 113 and the second electrode 111 are transparent, and may be made of Indium Tin Oxide (ITO), Indium Zinc Oxide (IZO) or the like.

In one embodiment, the first electrode 113 is a pixel electrode which is formed in each pixel of the LCD 1, the second electrode 111 is a common electrode used for inputting a common voltage (i.e., Vcom) from a driver IC (not shown) to the LCD 1.

In another embodiment, the first electrode 113 is a common electrode used for inputting a common voltage (i.e., Vcom) from a driver IC to the LCD 1, the second electrode 111 is a pixel electrode which is formed in each pixel of the LCD 1.

For easy illustration and description, it is assumed that the first electrode 113 is a pixel electrode, and the second electrode 111 is a common electrode.

The second substrate 12 may be a color filter substrate. The second substrate 12 may include a second transparent base 120, a third electrode 121, an overcoat layer 122, a color filter layer (not shown), a second alignment film (not shown), and a second polarizer (not shown). The third electrode 121, the overcoat layer 122, the color filter layer, the second alignment film and the second polarizer are formed on the second transparent base 120. The second polarizer is arranged on an outer surface of the second transparent base 120 far away from the liquid crystal layer 13. The second polarizer has a second light transmission axis which is perpendicular to the first light transmission axis of the first polarizer. The third electrode 121, the overcoat layer 122, the color filter layer and the second alignment film are arranged on an inner surface of the second transparent base 120 facing the liquid crystal layer 13. In the embodiment, the third electrode 121 is disposed between the second transparent base 120 and the overcoat layer 122. The second alignment film is located near the liquid crystal layer 13.

The third electrode 121 is used for controlling a viewing angle of the LCD 1, such that the LCD 1 can switch between a wide viewing angle and a narrow viewing angle when different bias voltages are applied to the third electrode 121.

The third electrode 121 is transparent, and may be made of Indium Tin Oxide (ITO), Indium Zinc Oxide (IZO) or the like.

The overcoat layer 122 is transparent. The overcoat layer 122 covers on the third electrode 121 and is mainly used for making the inner surface of the second substrate 12 to be smooth and planar.

The liquid crystal layer 13 is provided with a plurality of liquid crystal molecules 131 which are sealed between the first alignment film of the first substrate 11 and the second alignment film of the second substrate 12. The first alignment film and the second alignment film may be made of polyimide (PI). The first alignment film and the second alignment film are used to align the liquid crystal molecules 131, so that the liquid crystal molecules 131 are oriented in predetermined directions. For example, the alignment films each may be subjected to a rubbing treatment according to a publicly known rubbing process. After the rubbing process, the first alignment film is rubbed to have a first rubbing direction, and the second alignment film is rubbed to have a second rubbing direction. The liquid crystal molecules 131 adjacent to the first alignment film are arranged and oriented along the first rubbing direction of the first alignment film. The liquid crystal molecules 131 adjacent to the second alignment film are arranged and oriented along the second rubbing direction of the second alignment film.

Further, the liquid crystal molecules 131 in the liquid crystal layer 13 may be tilted at a pretilt angle. That is, an acute angle is formed between a horizontal direction and the long axis of the liquid crystal molecules 131, so that the liquid crystal molecules 131 are arranged along the rubbing directions of the alignment films at a tilted state with respect to the alignment films. In the embodiment, the liquid crystal molecules 131 adjacent to the first alignment film are tiled to have the same pretilt angle as the liquid crystal molecules 131 adjacent to the second alignment film. That is, the liquid crystal molecules 131 adjacent to the first alignment film and the liquid crystal molecules 131 adjacent to the second alignment film are tilted towards the same direction with the same pretilt angle. Preferably, the pretilt angle is in the range of 0°~5°, i.e., 0°≤θ≤5°.

Liquid crystal molecules are generally divided into positive liquid crystal molecules and negative liquid crystal molecules. In the present embodiment, the liquid crystal molecules 131 in the liquid crystal layer 13 are positive liquid crystal molecules. Since the positive liquid crystal molecules 131 will rotate to a direction parallel to an electric field, when the LCD 1 is applied with an electric field for display by a voltage difference between the first electrode 113 (i.e., the pixel electrode) and the second electrode 111 (i.e., the common electrode), the positive liquid crystal molecules 131 of the liquid crystal layer 13 will rotate in a plane in parallel to the substrates 11, 12 until the long axis of the positive liquid crystal molecules 131 is parallel to the electric field.

Referring to FIGS. 1-2, the LCD 1 can be switched between a wide viewing angle and a narrow viewing angle when different bias voltages are applied to the third electrode 121. In FIG. 1, the LCD 1 is shown for display with a wide viewing angle. In FIG. 2, the LCD 1 is shown for display with a narrow viewing angle. In the embodiment, "bias voltage" represents a voltage difference ($\Delta V_{3\text{-}2}$) between the third electrode 121 and the second electrode 111 (i.e., the common electrode).

Figure 3:
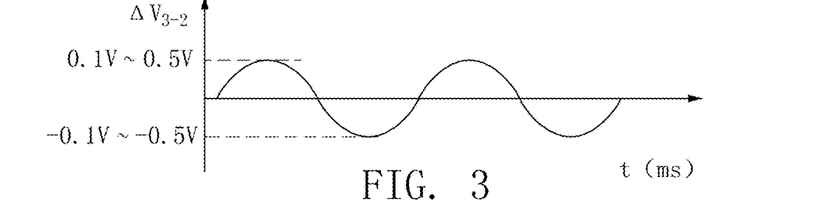
FIG. 3 schematically shows a wave form of a first bias voltage applied to the third electrode to achieve the wide viewing angle.

As shown in FIG. 1, when a first bias voltage is applied to the third electrode 121, the LCD 1 is displayed with a wide viewing angle. The first bias voltage preferably has a magnitude in the range from 0.1V~0.5V. In the embodiment, as shown in FIG. 3, the first bias voltage is in the form of an alternating voltage which is ranged from 0.1V~0.5V to −0.1V~−0.5V. Under the first bias voltage, a first vertical electric field along the vertical direction is generated between the first substrate 11 and the second substrate 12. Since the first bias voltage applied to the third electrode 121 is relatively small, the first vertical electric field is not strong enough to cause the liquid crystal molecules 131 in the liquid crystal layer 13 to rotate, such that the liquid crystal molecules 131 almost remain the original tilted state with a small pretilt angle, and no light leakage is resulted in a dark state when the LCD 1 is viewed from a squint direction, whereby the LCD 1 achieves a wide viewing angle.

Figure 4:
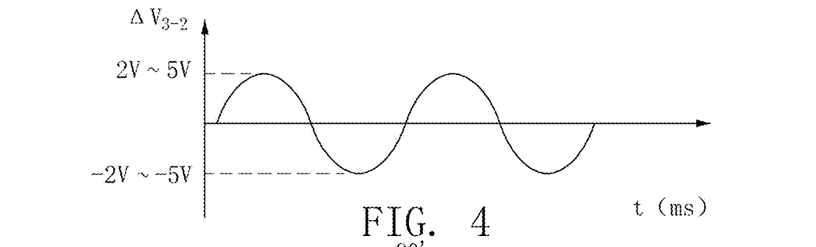
FIG. 4 schematically shows a wave form of a second bias voltage applied to the third electrode to achieve the narrow viewing angle.

As shown in FIG. 2, when a second bias voltage which is greater than the first bias voltage is applied to the third electrode 121, the LCD 1 is displayed with a narrow viewing angle. The second bias voltage preferably has a magnitude in the range from 2V~5V. In the embodiment, as shown in FIG. 4, the second bias voltage is in the form of an alternating voltage which is ranged from 2V~5V to −2V~−5V. Under the second bias voltage, a second vertical electric field along the vertical direction which is stronger than the first vertical electric field is generated between the first substrate 11 and the second substrate 12. Since the second bias voltage applied to the third electrode 121 is relatively large, the second vertical electric field is strong enough to cause the liquid crystal molecules 131 in the liquid crystal layer 13 to rotate, so that the positive liquid crystal molecules 131 will rotate in a plane orthogonal to the substrates 11, 12 under the second vertical electric field. After rotation, the liquid crystal molecules 131 adjacent to the first alignment film and the liquid crystal molecules 131 adjacent to the second alignment film have a tilt angle greater than the initial pretilt angle. As a result, lights passing through the liquid crystal molecules 131 are no longer matched with the light transmission axis of the first polarizer and the second polarizer due to phase delay, a light leakage is accordingly resulted in a dark state when the LCD 1 is viewed from a squint direction, the contrast between a bright state and a dark state of the LCD 1 is decreased, whereby the LCD 1 achieves a narrow viewing angle.

The viewing angle of the LCD 1 can be further adjusted by regulating the second bias voltage applied to the third electrode 121. In more detail, as the second bias voltage applied to the third electrode 121 increases, the liquid crystal molecules 131 will rotate to have a greater tilt angle, the light leakage is accordingly more serious, and the viewing angle of the LCD 1 is correspondingly reduced. In the embodiment, the first bias voltage applied to the third electrode 121 preferably has a magnitude in the range of 0.1V to 0.5V, and the second bias voltage applied to the third electrode 121 preferably has a magnitude in the range of 2V to 5V. When a bias voltage having a magnitude in the range of 0.1V~0.5V is applied to the third electrode 121, the LCD 1 is displayed with a wide viewing angle. When a bias voltage having a magnitude in the range of 2V~5V is applied to the third electrode 121, the LCD panel is displayed with a relatively narrow viewing angle, and by regulating the magnitude of the second bias voltage applied to the third electrode 121, the LCD 1 can have different viewing angles in the narrow viewing angle display mode, so that the viewing angle of the LCD 1 can be adjusted according to actual requirements to obtain a viewing angle as desired. For example, the LCD 1 will have a narrower viewing angle when a bias voltage having a magnitude of 5V is applied to the third electrode 121 compared with the case in which a bias voltage having a magnitude of 2V is applied to the third electrode 121. Moreover, the positive liquid crystal molecules 131 have the advantage of fast response, and the response time during the wide viewing angle and the narrow viewing angle can be maintained within 27 ms.

It should be noted that, in the peripheral edge, the first substrate 11 and the second substrate 12 may be electrically connected via an electrically conductive material such as gold balls, such that the bias voltage applied to the third electrode 121 of the second substrate 12 can be inputted from a printed circuit board (PCB) which is connected to the first substrate 11.

In the following, the LCD 1 is described in more detail with two specific examples. In a first example, the liquid crystal layer 13 has a thickness of 3.5 um (i.e., the LCD 1 has a cell gap of 3.5 um), and the overcoat layer 122 has a thickness in the range of 1.5 um~3.0 um. In a second example, the liquid crystal layer 13 has a thickness of 3.0 um (i.e., the LCD 1 has a cell gap of 3.0 um), and the overcoat layer 122 has a thickness of 1.5 um. In the first example and the second example, the first electrode 113 is stripe-like pixel electrode, the second electrode 111 is planar common electrode, the third electrode 121 is a planar electrode being patterned or not patterned, the overcoat layer 122 has a dielectric coefficient in the range of 3~4, and the insulating layer 112 has a thickness of 2000 Å. In practical applications, the insulating layer 112 may have a thickness of 1000 Å to 5000 Å.

Figure 5:
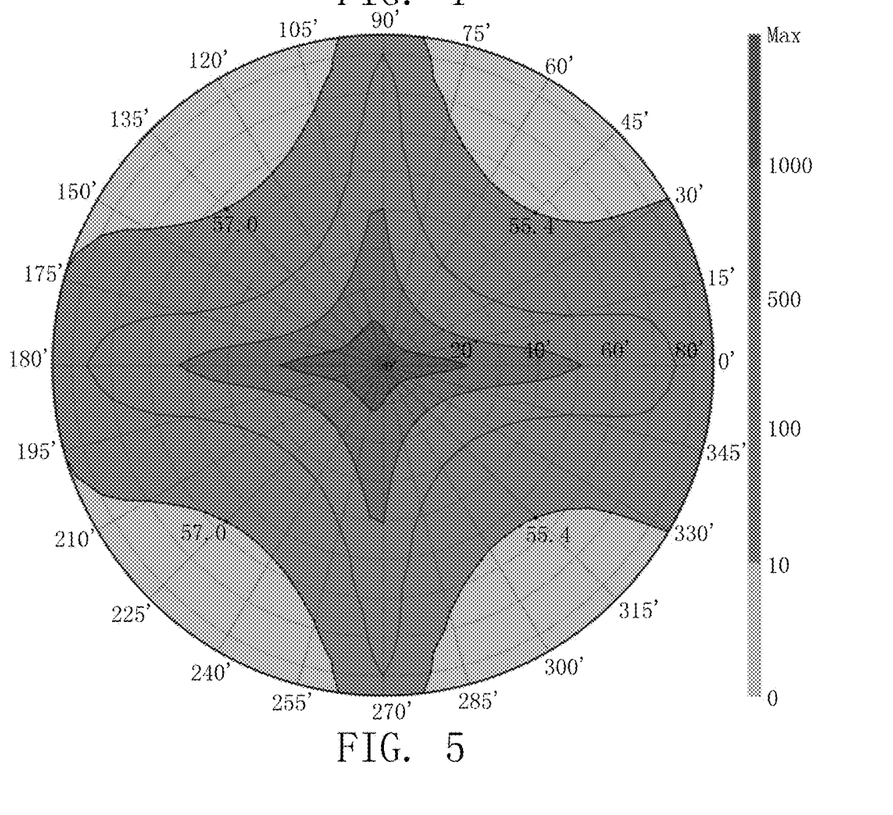
FIG. 5 shows the viewing angle simulation result of the first example of the LCD in the wide viewing angle.
Figure 6:
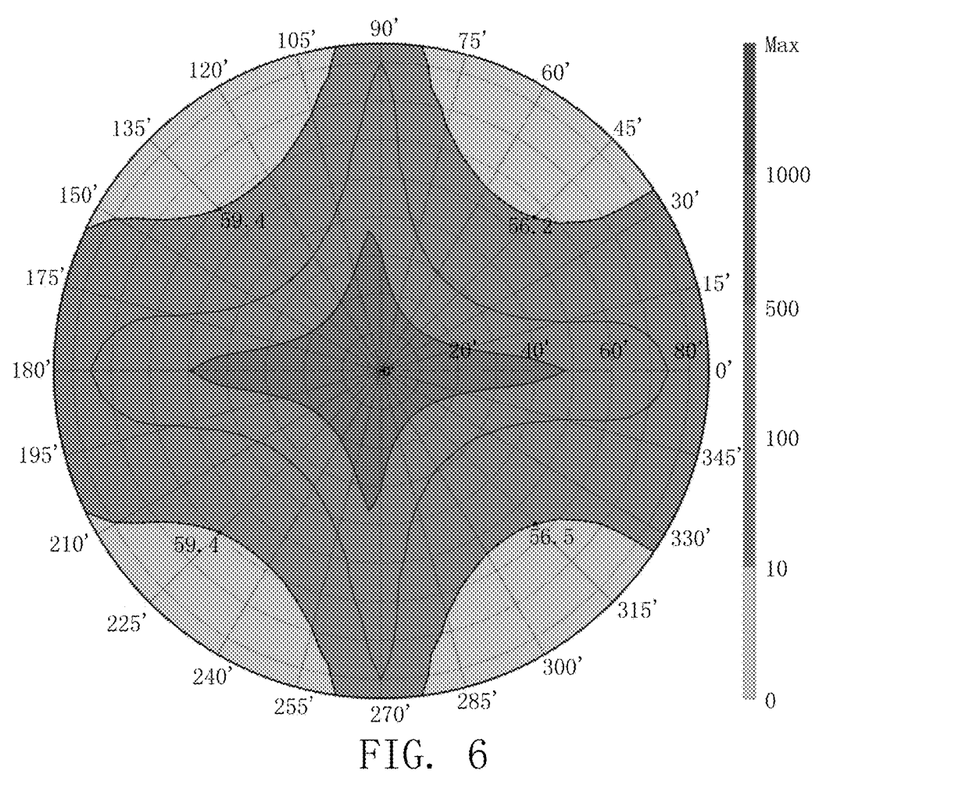
FIG. 6 shows the viewing angle simulation result of the second example of the LCD in the wide viewing angle.

FIG. 5 shows the viewing angle simulation result of the first example of the LCD 1 in the wide viewing angle. FIG. 6 shows the viewing angle simulation result of the second example of the LCD 1 in the wide viewing angle. In FIGS. 5-6, a first bias voltage having a magnitude of 0.2V is applied to the third electrode 121, and the LCD 1 is displayed in the wide viewing angle. In FIG. 5, the overcoat layer 122 has a thickness of 1.5 um. As can be seen from FIGS. 5-6, the LCD 1 in each of the first and second examples has a viewing angle from about −85° to about 85° both in the horizontal direction and in the vertical direction.

Thus, the LCD 1 can meet the requirements with wide viewing angle when the LCD 1 is displayed normally.

Figure 7A:
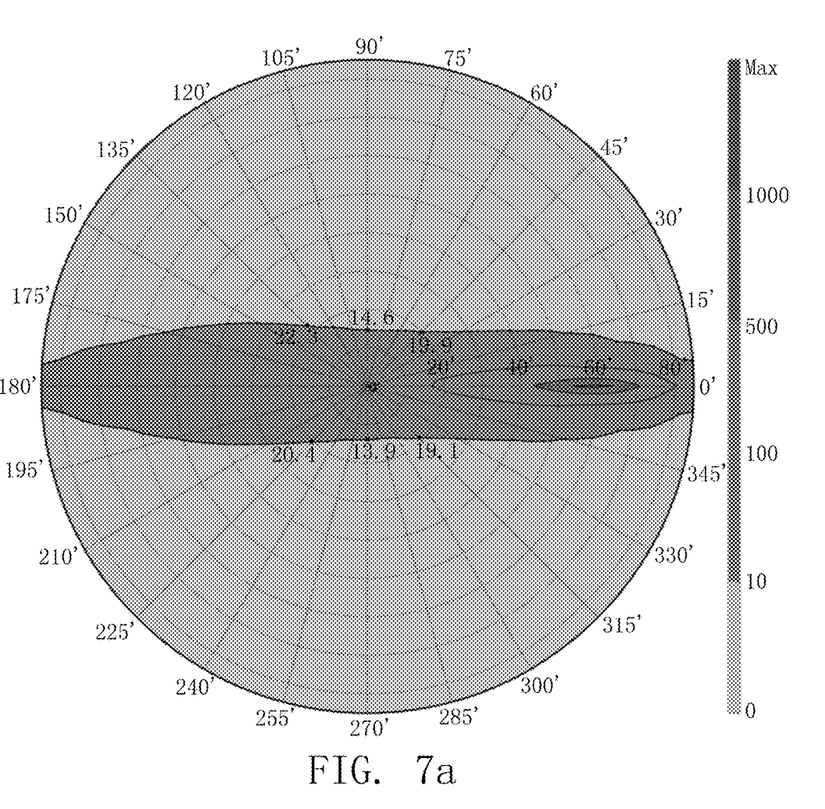
FIGS. 7a-7d show various viewing angle simulation results of the first example of the LCD 1 in the narrow viewing angle.
Figure 7B:
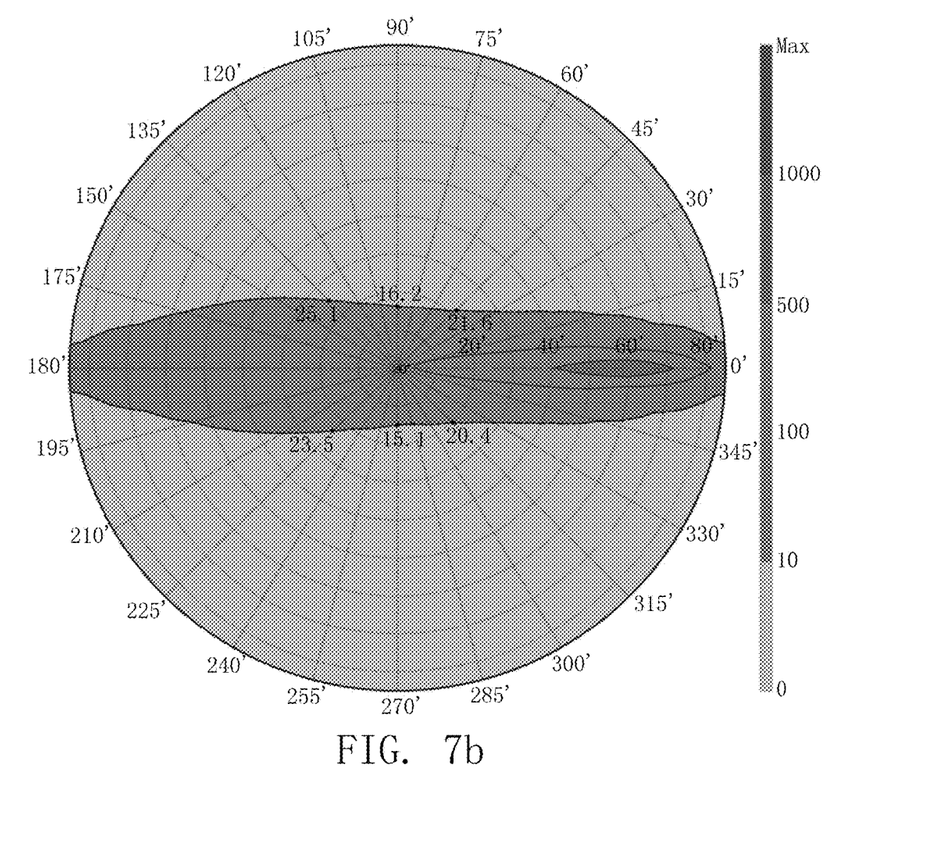
Figure 7C:
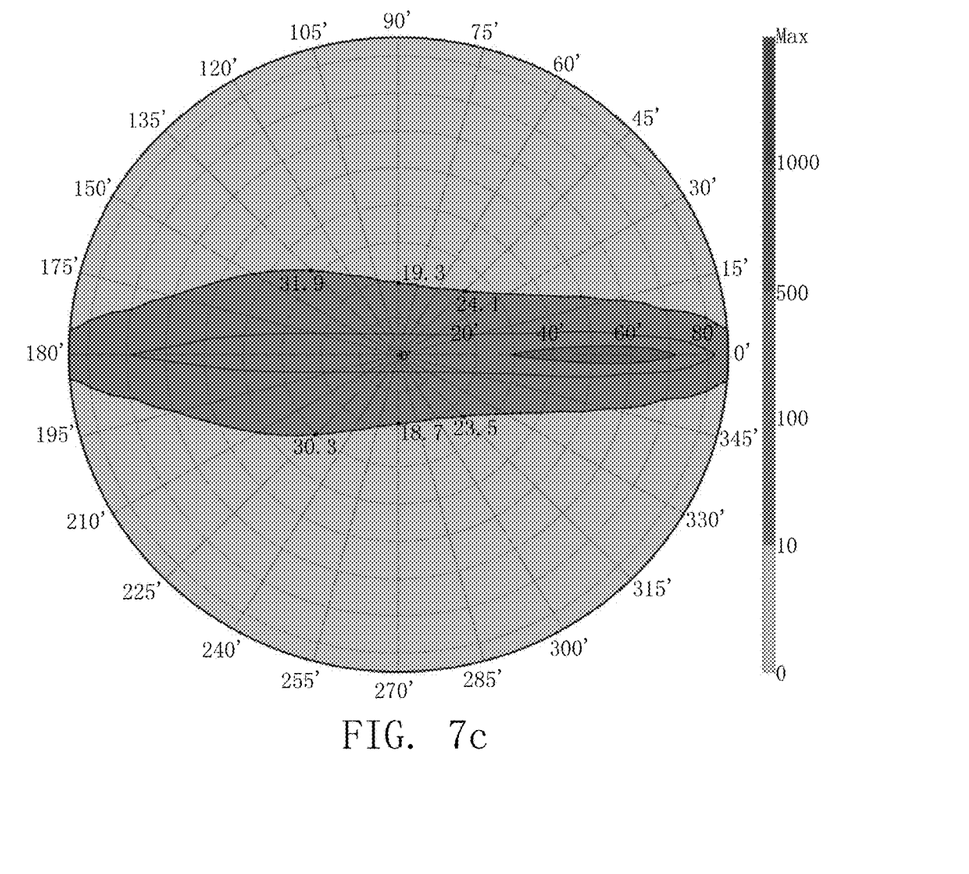
Figure 7D:
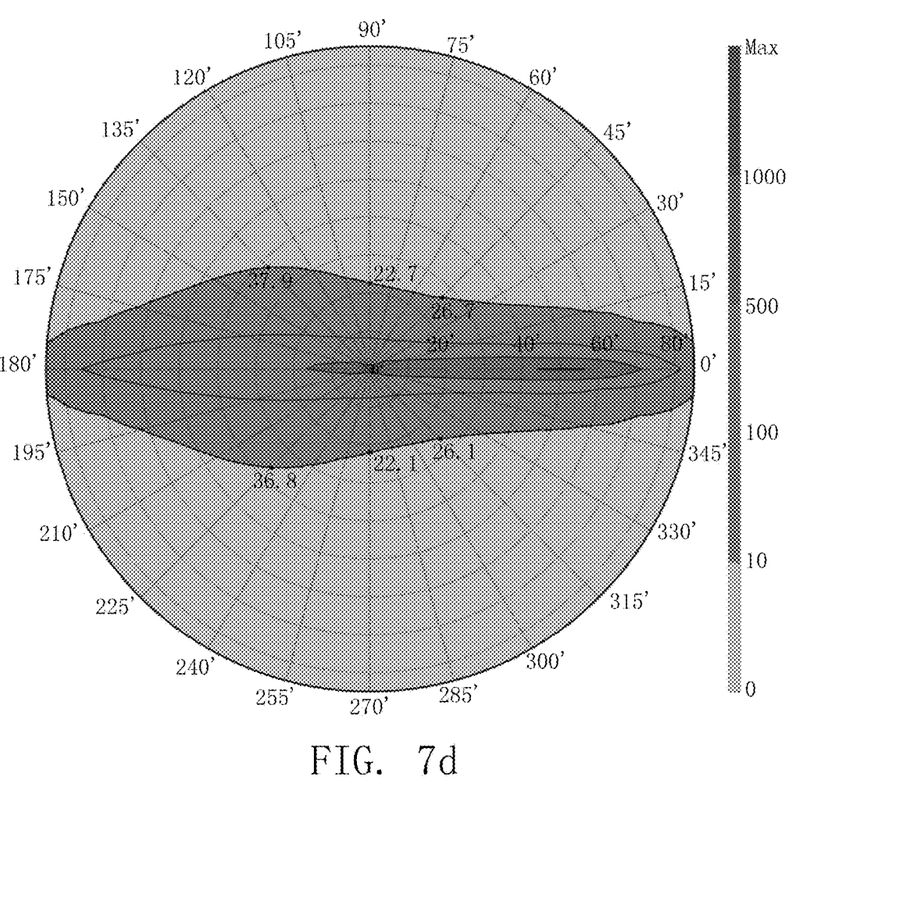

FIGS. 7a-7d show various viewing angle simulation results of the first example of the LCD 1 in the narrow viewing angle. In FIGS. 7a-7d, a second bias voltage having a magnitude of 3V is applied to the third electrode 121, and the LCD 1 is displayed in the narrow viewing angle. Further, in FIGS. 7a-7d, the overcoat layer 122 has different thicknesses. FIG. 7a shows the viewing angle simulation result of the first example of the LCD 1 when the overcoat layer 122 has a thickness of 1.8 um, FIG. 7b shows the viewing angle simulation result of the first example of the LCD 1 when the overcoat layer 122 has a thickness of 2.0 um, FIG. 7c shows the viewing angle simulation result of the first example of the LCD 1 when the overcoat layer 122 has a thickness of 2.5 um, and FIG. 7d shows the viewing angle simulation result of the first example of the LCD 1 when the overcoat layer 122 has a thickness of 3.0 um. As can be seen from FIGS. 7a-7d, the LCD 1 in the first example can achieve a relatively narrow viewing angle, especially when the overcoat layer 122 has a thickness smaller than 2.0 um, the viewing angle of the LCD 1 is reduced to be smaller than 25°, such that the LCD 1 can effectively meet the requirements with narrow viewing angle for protecting privacy in public places.

In addition, when the overcoat layer 122 has different thicknesses, the center contrast (CR) of the LCD 1 is different. For example, the center contrast (CR) is 38.28 in FIG. 7a, the center contrast (CR) is 47.37 in FIG. 7b, the center contrast (CR) is 72.83 in FIG. 7c, and the center contrast (CR) is 106.54 in FIG. 7d. That is, as the thickness of the overcoat layer 122 increases, the center contrast (CR) of the LCD 1 also increases. Thus, by regulating the thickness of the overcoat layer 122, the center contrast (CR) of the LCD 1 can be adjusted accordingly.

Figure 8:
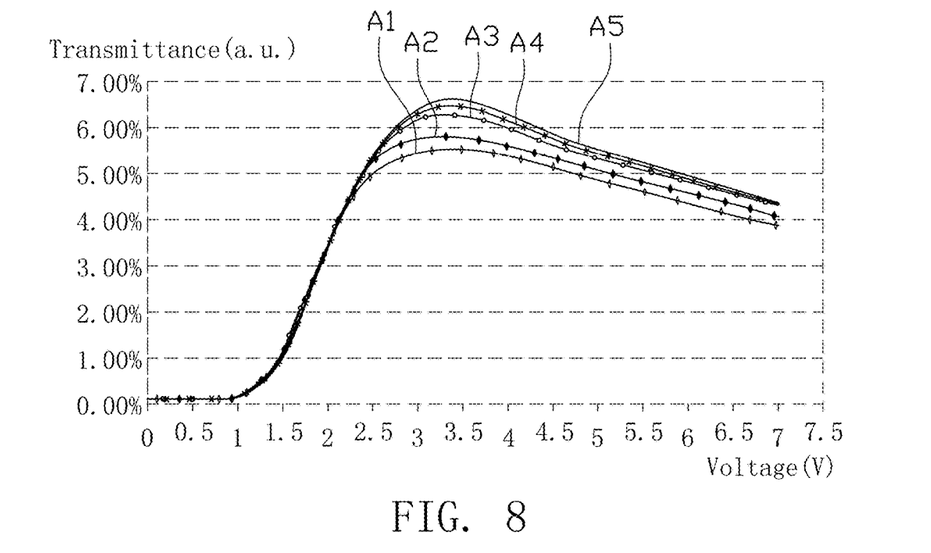
FIG. 8 is a graph showing the voltage to transmittance relationship of the first example of the LCD 1 in the wide viewing angle.
Figure 9:
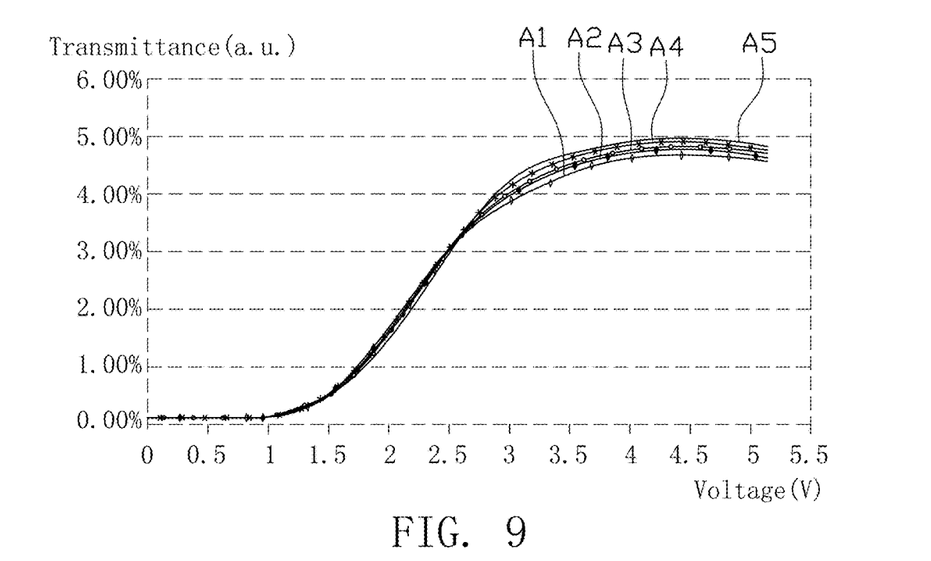
FIG. 9 is a graph showing the voltage to transmittance relationship of the second example of the LCD 1 in the wide viewing angle.

FIG. 8 is a graph showing the voltage to transmittance relationship of the first example of the LCD 1 in the wide viewing angle. In FIG. 8, the overcoat layer 122 has a thickness of 3.0 um, and the curves A1, A2, A3, A4, A5 denote the voltage to transmittance relationship when the first bias voltages applied to the third electrode 121 are respectively 0.1V, 0.2V, 0.3V, 0.4V, 0.5V. FIG. 9 is a graph showing the voltage to transmittance relationship of the second example of the LCD 1 in the wide viewing angle. In FIG. 9, the curves A1, A2, A3, A4, A5 denote the voltage to transmittance relationship when the first bias voltages applied to the third electrode 121 are respectively 0.1V, 0.2V, 0.3V, 0.4V, 0.5V. In FIGS. 8-9, the voltages listed in the horizontal coordinate represent a voltage difference $\Delta V_{1-2}$ between the first electrode 113 and the second electrode 111. In the present embodiment, the first electrode 113 is a pixel electrode and the second electrode 111 is a common electrode. The test result of FIG. 8 is listed in the following Table 1, and the test result of FIG. 9 is listed in the following Table 2. In Tables 1-2, $\Delta V_{3-2}$ denotes the bias voltage applied to the third electrode 121, $\Delta V_{op1-2}$ denotes the voltage difference between the first electrode 113 and the second electrode 111 when the LCD 1 has the maximal transmittance (Tr), L0_Tr denotes the transmittance of the LCD 1 when the gray scale is 0 (i.e., in a dark state), and L255_Tr denotes the transmittance of the LCD 1 when the gray scale is 255 (i.e., in a bright state).

TABLE 1

| $\Delta V_{3\text{-}2}$ | $\Delta V_{op1\text{-}2}$ | L0_Tr | L255_Tr |
|---|---|---|---|
| 0.1 V | 3.5 V | 7.0769E−04 | 5.53% |
| 0.2 V | 3.5 V | 7.0759E−04 | 5.77% |
| 0.3 V | 3.5 V | 7.0756E−04 | 6.25% |
| 0.4 V | 3.5 V | 7.0760E−04 | 6.44% |
| 0.5 V | 3.5 V | 7.0771E−04 | 6.58% |

TABLE 2

| $\Delta V_{3\text{-}2}$ | $\Delta V_{op1\text{-}2}$ | L0_Tr | L255_Tr |
|---|---|---|---|
| 0.1 V | 4.5 V | 4.7058E−05 | 4.69% |
| 0.2 V | 4.5 V | 4.6989E−05 | 4.76% |
| 0.3 V | 4.5 V | 4.6956E−05 | 4.83% |
| 0.4 V | 4 V | 4.6955E−05 | 4.88% |
| 0.5 V | 4 V | 4.6995E−05 | 4.94% |

It can be seen from FIGS. 8-9 and Tables 1-2, when the first bias voltage applied to the third electrode 121 increases from 0.1V to 0.5V, the transmittance of the LCD 1 in gray scale of 255 is gradually increased, however, the transmittance of the LCD 1 in gray scale of 0 is decreased firstly and then increased. As shown in FIG. 8 and Table 1 of the first example, the LCD 1 has the minimal transmittance in gray scale of 0 when the first bias voltage applied to the third electrode 121 is 0.3V. As shown in FIG. 9 and Table 2 of the second example, the LCD 1 has the minimal transmittance in gray scale of 0 when the first bias voltage applied to the third electrode 121 is 0.4V. In addition, when the overcoat layer 122 has a thickness in the range of 1.5 um~3.0 um and the liquid crystal layer 13 has a thickness in the range of 3.0 um~3.5 um, the LCD 1 will have a maximal transmittance between 6.58% (i.e., the maximal transmittance shown in Tables 1-2) and 4.69% (i.e., the minimal transmittance shown in Tables 1-2) in gray scale of 255. Moreover, in the first example shown in FIG. 8 and Table 1, the voltage difference applied between the first electrode 113 and the second electrode 111 is 3.5V when the LCD 1 has the maximal transmittance. In the second example shown in FIG. 9 and Table 2, the voltage difference applied between the first electrode 113 and the second electrode 111 is 4.5V or 4V when the LCD 1 has the maximal transmittance.

Figure 10:
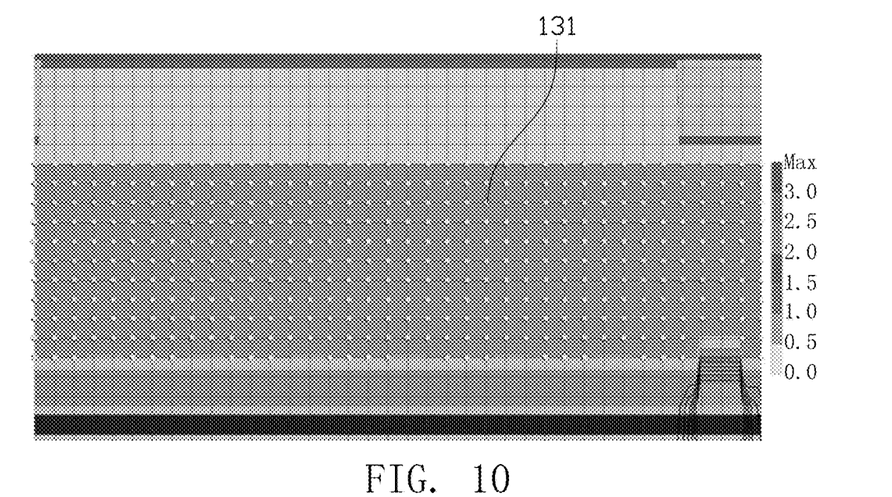
FIG. 10 is a photograph showing the rotation state of the liquid crystal molecules when the LCD is displayed in a dark state with the wide viewing angle.
Figure 11:
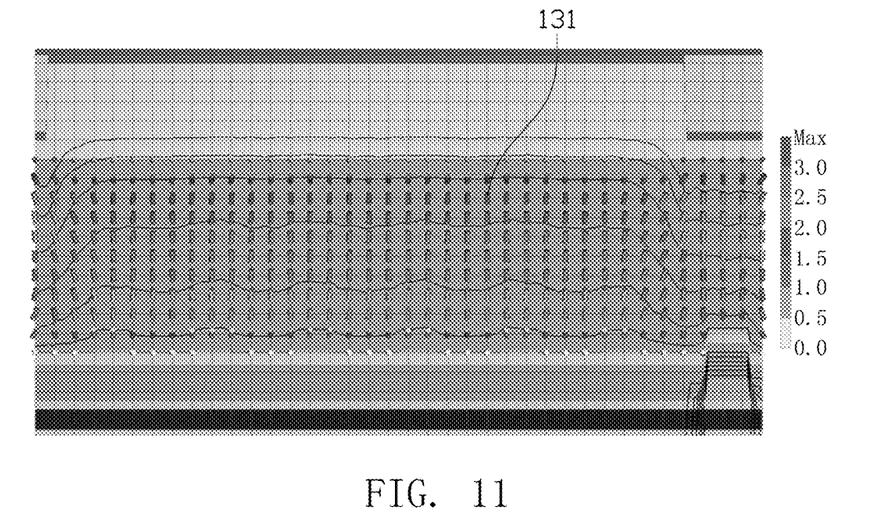
FIG. 11 is a photograph showing the rotation state of the liquid crystal molecules when the LCD is displayed in a dark state with the narrow viewing angle.

FIG. 10 is a photograph showing the rotation state of the liquid crystal molecules when the LCD is displayed in a dark state with the wide viewing angle. FIG. 11 is a photograph showing the rotation state of the liquid crystal molecules when the LCD is displayed in a dark state with the narrow viewing angle. In FIG. 10, a first bias voltage having a magnitude of 0.3V is applied to the third electrode 121, such that the LCD 1 has a wide viewing angle. In FIG. 11, a second bias voltage having a magnitude of 5V is applied to the third electrode 121, such that the LCD 1 has a narrow viewing angle. Since the first bias voltage is much smaller than the second bias voltage, the liquid crystal molecules 131 in FIG. 10 have a small rotation angle, whereby the LCD 1 achieves a wide viewing angle. However, since the second bias voltage applied to the third electrode 121 is 5V, a strong vertical electric field along the vertical direction is generated between the substrates 11, 12, and the liquid crystal molecules 131 in FIG. 11 will have a large rotation angle under the vertical electric field. As shown in FIG. 11, the liquid crystal molecules 131 are almost in a stand-up posture after rotation, and the tilt angle of the liquid crystal molecules 131 can reach to about 70°. As a result, a light leakage phenomenon is resulted in the dark state, the contrast between the bright state and the dark state is decreased, such that the viewing angle of the LCD 1 is reduced, whereby the LCD 1 achieves a narrow viewing angle.

Figure 12:
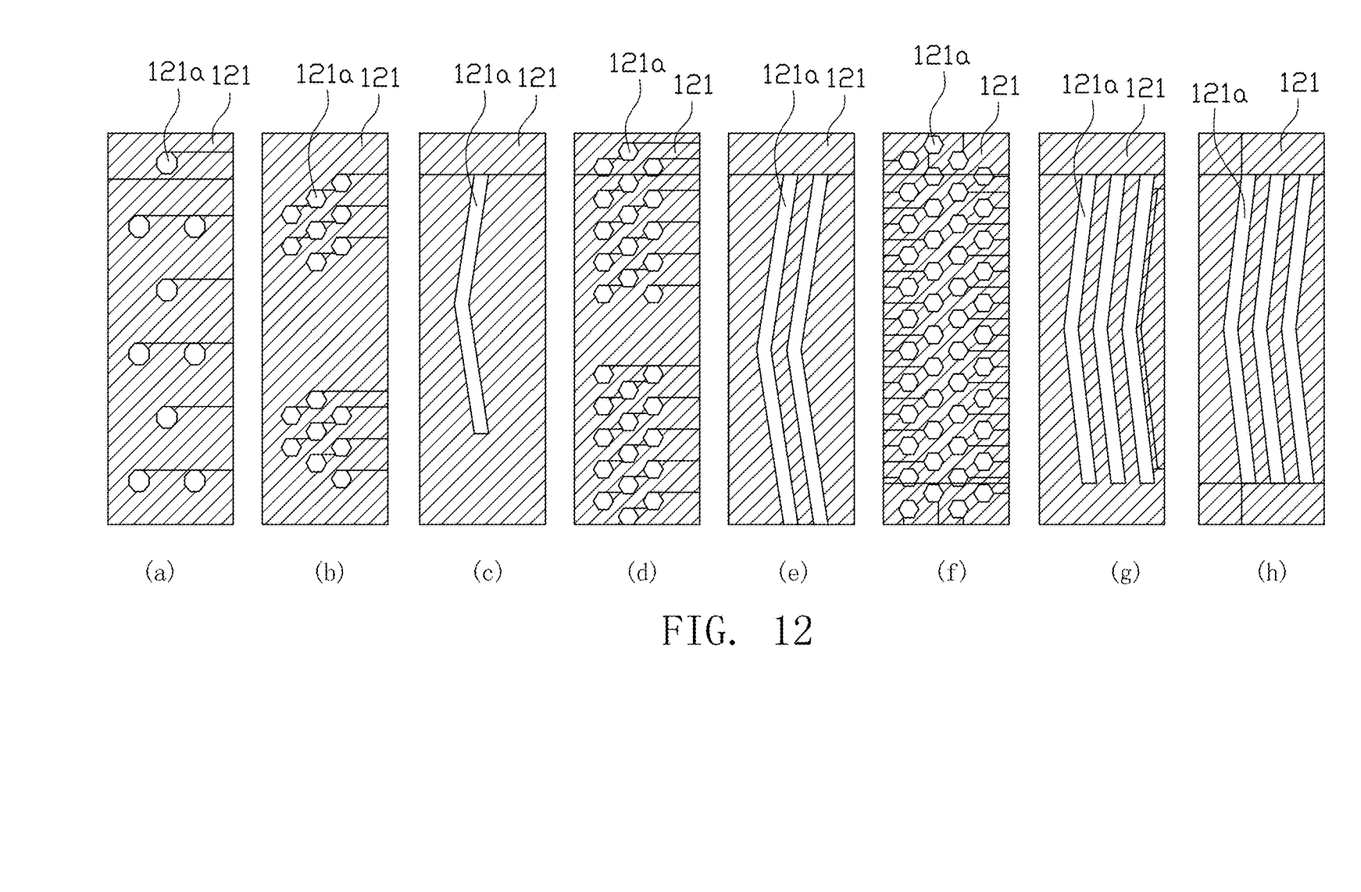
FIG. 12 shows plan views of a portion of the third electrode of the LCD according to the embodiment of the present application.

FIG. 12 shows plan views of a portion of the third electrode of the LCD according to the embodiment of the present application. In various different examples, the third electrode 121 can be a planar electrode without being patterned, or the third electrode 121 can be patterned to have different structures as particularly shown from (a) to (h) in FIG. 12, wherein the third electrodes 121 shown in (a)-(h) of FIG. 12 are patterned to define a plurality of holes or slots 121a therein, and the third electrodes 121 from (a) to (h) of FIG. 12 have different aperture ratios which are 5%, 10%, 15%, 20%, 29.74%, 30%, 46.09%, 46.09%, respectively.

Figure 13:
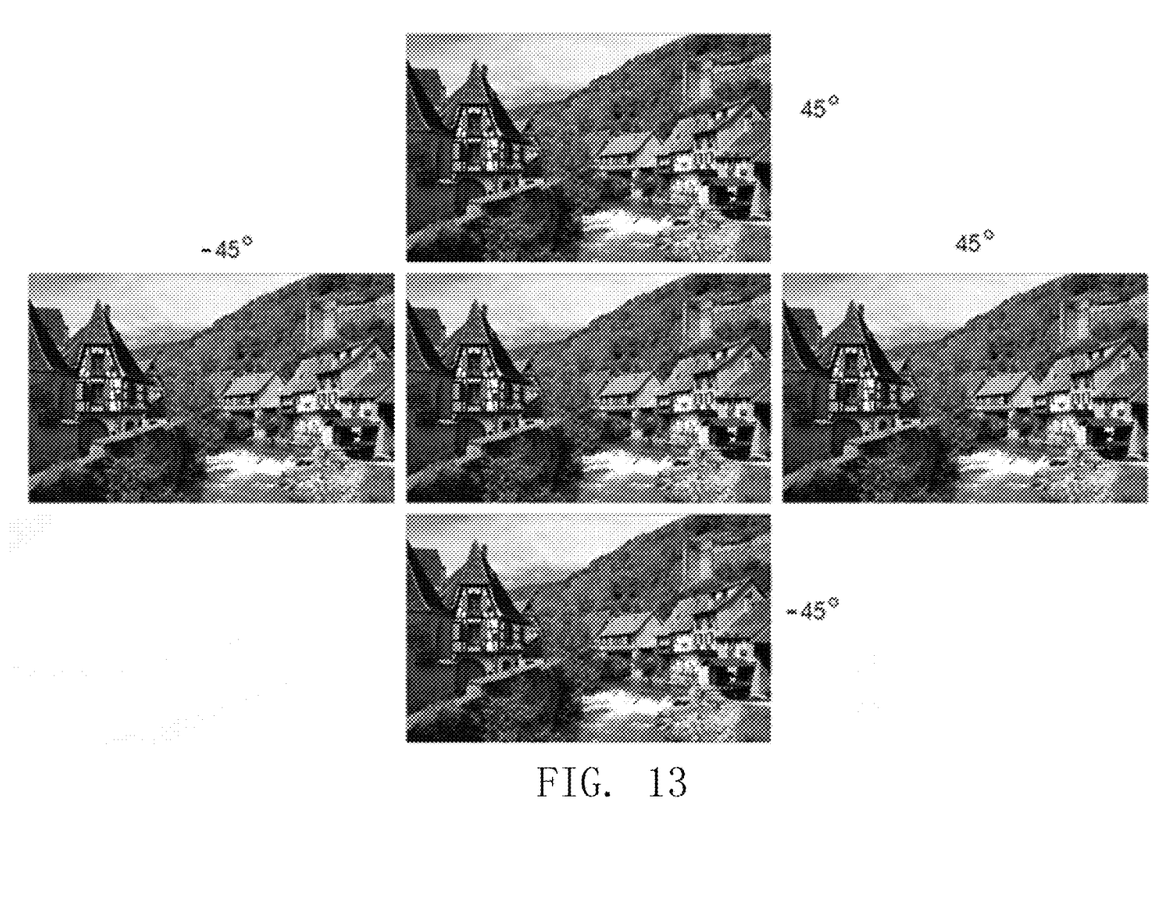
FIG. 13 shows the display effect of the LCD in the wide viewing angle.

FIG. 13 shows the display effect of the LCD in the wide viewing angle. It can be seen from FIG. 13, even though the third electrode 121 has different structures, the display effect when viewed from a squint direction is comparable with the display effect when viewed from the front of the screen, both in the horizontal direction and in the vertical direction of the LCD 1. Thus, the LCD 1 can achieve a wide viewing angle when a first bias voltage having a relatively small magnitude is applied to the third electrode 121, and the first bias voltage may have a magnitude in the range of 0.1V to 0.5V.

Figure 14:
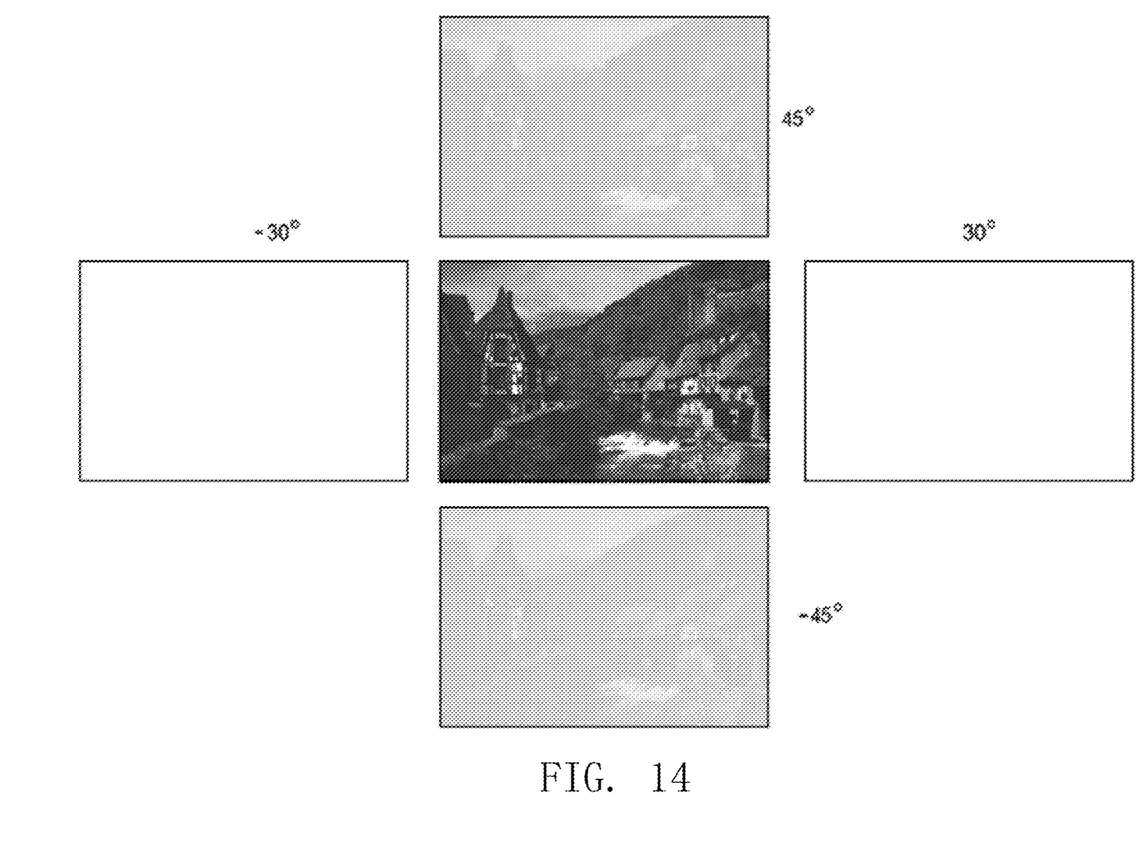
FIG. 14 shows the display effect of the LCD in the narrow viewing angle.

FIG. 14 shows the display effect of the LCD in the narrow viewing angle. It can be seen from FIG. 14, even though the third electrode 121 has different structures, the display effect of the LCD 1 when viewed from the front of the screen is comparable with the display effect of conventional FFS type LCDs, the display effect when viewed from a squint direction with a viewing angle of greater than 45° is poor compared with the display effect when viewed from the front of the screen in the vertical direction of the LCD 1, and almost no images can be viewed from a squint direction with a viewing angle of greater than 30° in the horizontal direction of the LCD 1. Thus, the LCD 1 can achieve a narrow viewing angle when a second bias voltage having a relatively large magnitude is applied to the third electrode 121, and the second bias voltage may have a magnitude in the range of 2V to 5V.

In addition, when the third electrode 121 is designed to have different structures or different aperture ratios, as shown in (a) to (h) of FIG. 12, the LCD 1 may have the narrow viewing angle and the contrast be adjusted slightly.

From the above, in the present LCD 1, the liquid crystal molecules 131 in the liquid crystal layer 13 are positive liquid crystal molecules. When the third electrode 121 is applied with a first bias voltage having a relatively small magnitude, the liquid crystal molecules 131 will almost remain their original state, almost no light leakage is resulted in the dark state as the LCD 1 is viewed from a squint direction, so that the LCD 1 can achieve a wide viewing angle. When the third electrode 121 is applied with a second bias voltage having a relatively large magnitude, a vertical electric field along the vertical direction is generated between the substrates 11, 12, the positive liquid crystal molecules 131 will rotate in a plane orthogonal to the substrates 11, 12 to possess a relatively large tilt angle relative to the substrates 11, 12, a light leakage is resulted in the dark state as the LCD 1 is viewed from a squint direction, and the contrast between the bright state and the dark state of the LCD 1 is decreased, so that the LCD 1 can achieve a narrow viewing angle. Therefore, the LCD 1 can switch between a wide viewing angle and a narrow viewing angle by applying different bias voltages to the third electrode 121.

Preferably, the first bias voltage has a magnitude in the range of 0.1V to 0.5V, and the second bias voltage has a magnitude in the range of 2V to 5V.

Further, when the second bias voltage applied to the third electrode 121 is regulated, the viewing angle of the LCD 1 in the narrow viewing angle display mode can be adjusted. In detail, as the second bias voltage applied to the third electrode 121 increases, the liquid crystal molecules 131 will rotate to have a greater tilt angle, the light leakage phenomenon in the dark state is more serious, and the viewing angle of the LCD 1 is further reduced. Thus, the viewing angle of the LCD 1 is adjustable under the narrow viewing angle display mode, and the user can adjust the viewing angle of the LCD 1 according to the actual requirements of protecting privacy by regulating the second bias voltage applied to the third electrode 121.

In addition, the first bias voltage and the second bias voltage applied to the third electrode 121 are each preferably in the form of an alternating voltage, which is helpful in reducing the image sticking problem in LCD.

Moreover, when the third electrode 121 is designed to have different structures or different aperture ratios, the viewing angle and the contrast of the LCD 1 in the narrow viewing angle display mode can also be modulated and adjusted slightly.

In another aspect, a method of controlling a viewing angle of the LCD 1 is provided. The method includes the steps: when the LCD 1 is required to display with a wide viewing angle, applying a first bias voltage to the third electrode 121; and when the LCD 1 is required to display with a narrow viewing angle, applying a second bias voltage greater than the first bias voltage to the third electrode 121. Preferably, the first bias voltage applied to the third electrode 121 is in the range of 0.1V to 0.5V, and the second bias voltage applied to the third electrode 121 is in the range of 2V to 5V.

Thus, the present LCD 1 can easily achieve a wide viewing angle and a narrow viewing angle by controlling the bias voltage applied to the third electrode 121, the present LCD 1 can be switched between the wide viewing angle and the narrow viewing angle according to requirements. It is not required to use a louver shielding film or to provide a dual light source backlight system in the LCD, without increasing the thickness and the cost of the LCD and having the advantages of easy operation and good flexibility.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An LCD (liquid crystal display) with a switchable viewing angle, comprising:
    a first substrate being provided with a first electrode and a second electrode, wherein one of the first electrode and the second electrode is a pixel electrode, and the other one of the first electrode and the second electrode is a common electrode;
    a second substrate being provided with a third electrode; and
    a liquid crystal layer being disposed between the first substrate and the second substrate, the liquid crystal layer comprising a plurality of liquid crystal molecules, wherein the liquid crystal molecules are positive liquid crystal molecules;
    wherein the liquid crystal molecules in the liquid crystal layer are tilted at a pretilt angle, the pretilt angle is in the range of 0° to 5°, the liquid crystal molecules adjacent to the first substrate are tilted to have the same pretilt angle as the liquid crystal molecules adjacent to the second substrate;
    wherein when a first bias voltage is applied to the third electrode, the LCD is displayed with a wide viewing angle; and when a second bias voltage greater than the first bias voltage is applied to the third electrode, the LCD is displayed with a narrow viewing angle;
    wherein the first bias voltage is in the range of 0.1V to 0.5V, and the second bias voltage is in the range of 3V to 5V;
    wherein the first bias voltage and the second bias voltage are each in the form of an alternating voltage;
    wherein the first substrate further comprises a first transparent base, the first electrode and the second electrode are arranged on a surface of the first transparent base facing the liquid crystal layer;
    wherein the second substrate further comprises a second transparent base and an overcoat layer, the third electrode and the overcoat layer are arranged on a surface of the second transparent base facing the liquid crystal layer, the third electrode is disposed between the second transparent base and the overcoat layer;
    wherein the overcoat layer has a thickness in the range of 1.5 um to 3.0 um;
    wherein the first electrode is a pixel electrode, and the second electrode is a common electrode;
    wherein the first electrode is patterned to form a plurality of stripe-like electrodes, and the second electrode is a surface electrode without being patterned;
    wherein an insulating layer is disposed between the first electrode and the second electrode, with the first electrode being disposed above the second electrode.

2. The LCD according to claim 1, wherein the third electrode is a surface electrode without being patterned.

3. The LCD according to claim 1, wherein the third electrode is patterned to define a plurality of holes or slots therein.

4. The LCD according to claim 1, wherein the liquid crystal layer has a thickness in the range of 3.0 um to 3.5 um.

5. A method of controlling a viewing angle of the LCD of claim 1, comprising the steps:
    when the LCD is required to display with a wide viewing angle, applying a first bias voltage to the third electrode; and
    when the LCD is required to display with a narrow viewing angle, applying a second bias voltage greater than the first bias voltage to the third electrode.

6. The method according to claim 5, further comprising regulating the second bias voltage applied to the third electrode such that the viewing angle of the LCD is further adjusted.

* * * * *